June 23, 1970  G. W. MORGAN  3,517,110
FLEXIBLE UNDERWATER RISER CONTAINING ELECTRICAL
CONDUCTORS AND MATERIAL CONDUITS
Filed April 1, 1968

INVENTOR.
GEORGE W. MORGAN

BY *Wallace B. King*

ATTORNEY

United States Patent Office 3,517,110
Patented June 23, 1970

3,517,110
FLEXIBLE UNDERWATER RISER CONTAINING ELECTRICAL CONDUCTORS AND MATERIAL CONDUITS
George W. Morgan, Anaheim, Calif., assignor to North American Rockwell Corporation
Filed Apr. 1, 1968, Ser. No. 717,540
Int. Cl. H01b 7/00; H02g 9/12; B63b 21/52
U.S. Cl. 174—47                          4 Claims

ABSTRACT OF THE DISCLOSURE

A flexible underwater riser capable of sustaining high environmental loads by means of a high tensile strength central core member. A plurality of material conduits and electrical conductors are situated about the central core member and a flexible protective sheath bundles the conduits together. The spaces between the conduits and conductors within the sheath may be filled with an elastomeric filler to provide an integral characteristic to the riser structure, and to isolate and insulate said conduits and conductors against mutual abrasion and temperature variations.

BACKGROUND OF THE INVENTION

Field of the invention

The invention relates to underwater riser assemblies, and more particularly to risers capable of susbtaining high environmental loads which in addition have substantial flexibility.

Description of the prior art

In the design of prior art riser structures a basic decision was made initially between a flexible structure which permits maximum lateral excursion (caused near the water surface by turbulent conditions), or a rigid beam-like structure which permits a minimum of lateral excursion due to a high tension load exerted thereon. Such a high tension load may be created by providing a combination of a buoyant device attached to the head of the riser structure, and a tension force applied when a ship is connected to the upper end of the riser structure.

In the past, riser structures designed to permit large lateral excursions have been comprised of a single, or perhaps two or three flexible tubes bound together and having low buoyancy. Where two or more tubes are utilized there exists the problem of mutual abrasion occasioned when the riser bends and sways with the dynamic medium. In time such abrasion will wear thin the walls of the tubes resulting in failure thereof. The maximum practical depth of risers of this type has been on the order of one hundred feet.

Multi-conduit risers having a rigid moment resistant exterior member designed to minimize lateral excursion have not been developed due to at least two reasons. The first reason is the great expense that would be involved in such a design. Secondly, the environmental stresses required to be withstood during the severest wave forces which may be encountered (for example, a one hundred year storm) are greater than the properties of presently available practical materials. With a riser of any substantial diameter, the bending stresses on the rigid outer shell become irresistible.

A new and different approach to the design of high-tension multi-conduit riser structures is needed to accommodate the severest conditions which may be encountered in a rough sea, and the present invention provides such an approach with a riser structure capable of sustaining high environmental loads while having flexible characteristics which minimize the effects of bending stresses.

SUMMARY OF THE INVENTION

In accordance with the present invention there is set forth a flexible high-tension sustaining riser structure. The riser is a substantially integrated cable-like member comprising a plurality of conduits and electrical conductors situated about a high-tension core member (structural cable), and having an elastomeric filler surrounding each and electrical conductor. The whole combination of core member, conduits, and filler is encased by a flexible protective sheath. Such a riser structure can be anchored under relatively high tension (for example, between a riser base in a sub-surface oil production field, and a surface ship) in order to minimize lateral excursion of the riser. The tension need not be so great as to eliminate all excursion since the riser is flexible and capable of sustaining moderate bending stresses.

OBJECTS

It is therefore an object of the present invention to provide an improved underwater riser.

Another object of the present invention is to provide a high-tension underwater riser having flexible characteristics.

A further object of this invention is to provide a flexible riser comprised of multiple conduits and conductors between which mutual abrasion is eliminated.

A still further object of the present invention is to provide an underwater riser for use in water depths measured in thousands of feet.

Still other objects, features, and attendant advantages of the present invention will become apparent to those skilled in the art from a reading of the following detailed description of an embodiment construction in accordance therewith, taken in conjunction with the accompanying drawings.

DESCRIPTION OF THE PREFERRED EMBODIMENTS

Figure 1:
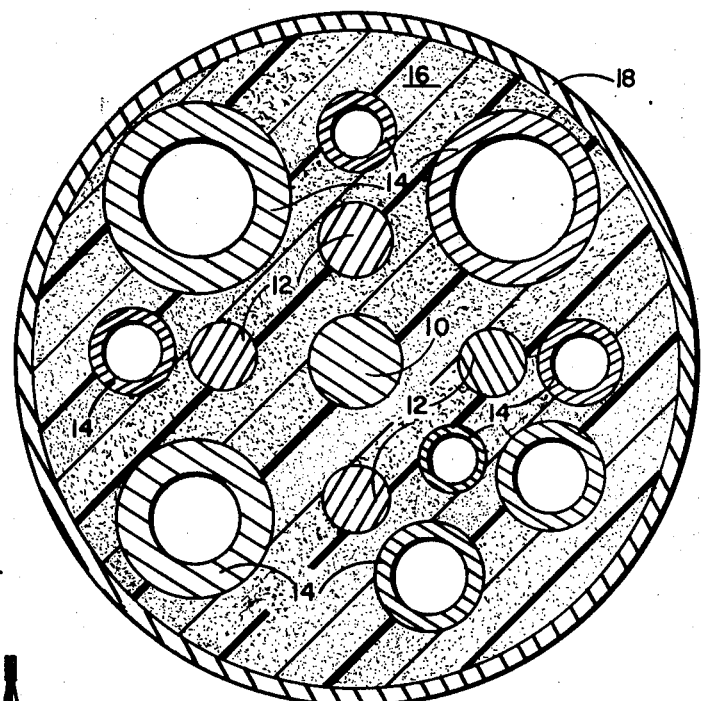
FIG. 1 illustrates a cross-sectional view of a riser according to the present invention.

Referring now to FIG. 1, there is shown a cross-sectional view of an underwater riser designed according to the present invention. There is shown a structural core member 10 at the center of the center of the riser. Core member 10 is capable of sustaining high-tension loads. A wide variety of presently available braided steel cables may serve adequately to provide the tension carrying capacity required of the riser.

Situated about the periphery of core member 10 are a plurality of electrical conductors and data transmission lines 12. Such conductors 12 may be utilized for transmission of electric power, communication signals, and for whatever other purpose may be required under the circumstances. There is further shown a plurality of flexible conduits 14, some of which may be high pressure flexible hoses, or plastic or metal tubes each of which is utilized to perform a specified function. Such functions may be to carry hydrocarbons, water, air or other gases, and for the venting of unwanted substances and gases. The high pressure lines may be utilized for transporting crude oil, or for carrying water or gas injected under high pressure. Depending on the requirements of the particular operation involved, a relatively large number and variety of flexible conduits and hoses may be arranged about core member 10 to form an underwater riser according to the present invention.

Also shown in FIG. 1 as the shaded substance between and around the core member 10, conductors 12, and hoses or tubes 14 is an elastomeric filler 16. The flexible filler 16 may be composed of a variety of synthetic rubbers which are well known to those skilled in the art. Elastomeric filler 16 may be foamed to a greater or lesser degree as a means for varying the buoyancy of the riser structure. Filler 16 must be selected to have adequate resistance to the hydrostatic loads which will be encountered at the intended depth at which the riser will be used. At greater depths filler 16 must be more dense, i.e. less foamed. Flexible filler 16 provides a variety of useful functions. As just described, the buoyancy of the riser is controllable by variations in the density of elastomeric filler 16, although it is clear that the total buoyancy problem may not be solved in this manner and that external ring buoys may be attached to the riser structure. By isolating the individual cable, conductors, and hoses, elastomeric filler 16 minimizes the transfer of bending stresses between such longitudinal components of the riser assembly. The filler 16 also serves to integrate the total riser assembly and provides for a relatively uniform external profile for the riser.

Still another advantage of the elastomeric filler 16 is the insulation provided between conduits which may carry fluids of widely varying temperatures. By insulating such temperatures, stresses resulting from the temperature differentials are minimized.

To make the structure of the riser complete and more capable of withstanding the severe conditions of its environment, a flexible protective sheath 18 is provided about the circumference of the riser assembly. Such a sheath also serves to firmly bundle all of the components together. It should be understood, however, that in some cases it may be advantageous to design a riser cable without the elastomeric filler and the flexible sheath. In such a case, the cable and conduits may be maintained as an integral unit by, for example, a spiral wind thereabout or intermittent hoops placed to constrain the individual members together.

Figure 2:
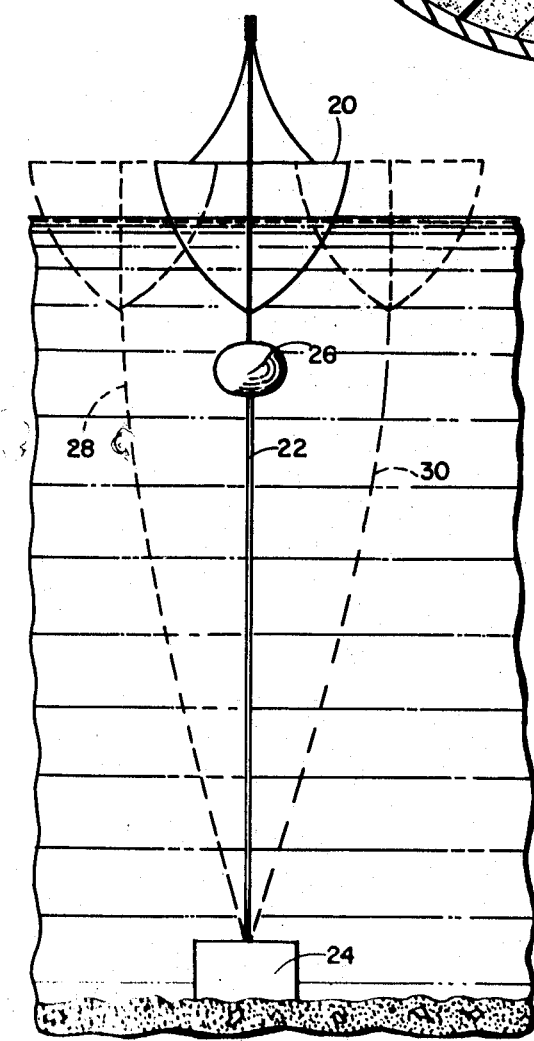
FIG. 2 depicts a surface vessel connected to a riser which is fastened to a riser base on the underwater floor.

Referring now to FIG. 2, there is shown represented a surface vessel 20 which is coupled to a riser 22 which is designed according to the present invention. Riser 22 is coupled at the deep end to a riser base 24 located on the earth floor beneath the water. A high tension load is exerted by the vessel 20 upon the riser 22, in conjunction with the buoyant force of buoy 26 in order to maintain the riser in a substantially straight line. Further, because riser 22 is also designed to be flexible, a certain amount of lateral displacement or excursion thereof is tolerable. Such displacement is indicated by the dashed lines 28 and 30. In fact, riser 22 is so designed that, under operational tension, it can safely withstand and accept lateral excursions which may result from the most severe storms which may be anticipated on the ocean surfaces. With the high tension cable situated in the center of riser 22, and having a small circumference, the bending stresses which are exerted thereon are well within the tensile limits thereof. A riser assembly constructed according to the present invention is not limited to a few or even several hundred feet, as has been the case with riser assemblies presently in use. Such a riser assembly, as hereinabove described, is capable of safe and sustained operation at depths of several thousand feet.

Figure 3:
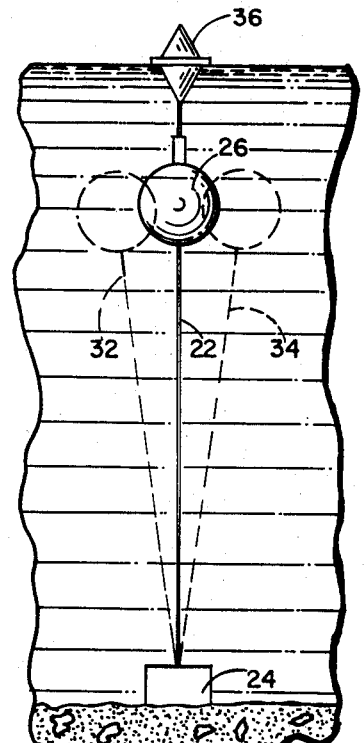
FIG. 3 shows a riser fastened to a riser base and to a buoyant sphere below the water surface for maintaining the riser in a near vertical attitude.

FIG. 3 is provided to illustrate riser 22 when not connected to a surface vessel. Buoy 26 provides sufficient tension upon riser 22 to maintain a substantially vertical attitude. Lateral excursions, resulting from lateral loads, are limited by the buoyant force of buoy 26 to the dashed lines 32 and 34 as shown. A small surface buoy 36 is shown attached to the riser head for location purposes.

What is claimed is:
1. An underwater riser comprising:
  means for sustaining tension loads forming a core for said riser,
  a plurality of conducting means situated about said core,
  means bundling said conducting means and said core together,
  an elastomeric filler completely surrounding each conducting means and filling the space between said core and said bundling means, and
  said plurality of conducting means including:
  electrical conduction means situated about the circumference of said core for providing transmission of electrical power and information signals along the length of said riser, and
  material conduction means situated about said electrical conduction means through which a plurality of material substances may flow along the length of said riser.
2. A flexible underwater riser comprising:
  means for sustaining tension loads forming a core for said riser,
  means for electrical conduction situated about said core,
  means situated about said core for providing conduction of a plurality of material substances,
  means bundling together said first, second and third means, and
  an elastomeric filler completely surrounding each means for electrical conduction and material conduction, said filler completely filling the space between said core and said bundling means.
3. The device of claim 2 wherein said bundling means comprises flexible sheath means encompassing said electrical and material conduction means.
4. An underwater riser comprising:
  a plurality of conduits and conductors,
  a core member having high tensile strength and a diameter substantially smaller than the diameter of said riser,
  means bundling said plurality of conduits and conductors and said core member together and made of a flexible sheath means, and
  an elastomeric filler filling the space remaining within said sheath means,
  said filler comprising:
  a foamed synthetic material surrounding each of said plurality of conduits and conductors and isolating said conduits and conductors whereby the transfer of bending stresses therebetween is minimized,
  said foamed material having a density which increases along the length of said riser in accordance with the submerged depth thereof.

References Cited
UNITED STATES PATENTS

| | | | |
|---|---|---|---|
| 989,532 | 4/1911 | Macduffee | 174—47 |
| 2,186,793 | 1/1940 | Wodtke | 174—27 |
| 2,518,454 | 8/1950 | Elliott | 174—116 X |
| 3,017,934 | 1/1962 | Rhodes et al. | 9—8 X |
| 3,281,571 | 10/1966 | Gilmore | 174—47 X |
| 3,344,888 | 10/1967 | Connelly et al. | 174—47 X |
| 3,375,324 | 3/1968 | Miller | 174—101.5 |

LARAMIE E. ASKIN, Primary Examiner

U.S. Cl. X.R.

9—8; 61—46; 114—.5; 166—.5; 174—70, 101.5, 116